United States Patent
Glasberg et al.

(10) Patent No.: US 9,862,136 B2
(45) Date of Patent: Jan. 9, 2018

(54) METHOD AND APPARATUS FOR SPIRALLY WINDING A THERMOPLASTIC PROFILE IN THE MANUFACTURE OF WELDED PLASTIC TUBES

(71) Applicant: UPONOR INFRA OY, Vantaa (FI)

(72) Inventors: Christian Glasberg, Vaasa (FI); Kari Karjalainen, Vaasa (FI); Johan Portman, Vaasa (FI); Sven Sjöberg, Vaasa (FI)

(73) Assignee: UPONOR INFRA OY, Vantaa (FI)

( * ) Notice: Subject to any disclaimer, the term of this patent is extended or adjusted under 35 U.S.C. 154(b) by 286 days.

(21) Appl. No.: 14/443,712

(22) PCT Filed: Nov. 19, 2013

(86) PCT No.: PCT/FI2013/051083
§ 371 (c)(1),
(2) Date: May 19, 2015

(87) PCT Pub. No.: WO2014/080077
PCT Pub. Date: May 30, 2014

(65) Prior Publication Data
US 2015/0336325 A1    Nov. 26, 2015

(30) Foreign Application Priority Data
Nov. 20, 2012 (FI) ................................. 20126220

(51) Int. Cl.
*B29C 53/58* (2006.01)
*B29C 53/78* (2006.01)
(Continued)

(52) U.S. Cl.
CPC ............ *B29C 53/78* (2013.01); *B29C 53/821* (2013.01); *B29C 53/562* (2013.01); *B29C 53/58* (2013.01);
(Continued)

(58) Field of Classification Search
CPC ...... B29C 53/562; B29C 53/58; B29C 53/827; F16L 9/16
See application file for complete search history.

(56) References Cited

U.S. PATENT DOCUMENTS 3,861,984 A    1/1975 Poulsen
3,914,151 A    10/1975 Poulsen
(Continued)

FOREIGN PATENT DOCUMENTS

EP        1 237 708 B1    10/2005
WO    WO 00/50220 A1    8/2000

OTHER PUBLICATIONS

International Search Report, issued in PCT/FI2013/051083, dated Feb. 21, 2014.
(Continued)

*Primary Examiner* — Carson Gross
(74) *Attorney, Agent, or Firm* — Birch, Stewart, Kolasch & Birch, LLP

(57) ABSTRACT

A method of spirally winding a thermoplastic profile in the manufacture of welded plastic tubes and a winding apparatus for manufacturing a spirally wound tube. A thermoplastic profile is received on a plurality of sliding members being arranged in an axial direction of the tube to be manufactured and defining an essentially cylindrically shaped winding surface with a diameter essentially corresponding to the inner diameter of the tube. The profile is directed along a spiral path towards the previous turn of the profile in order to force opposite edges of the profile together for welding. The radial position of the sliding member is adjusted to control the tension in the thermoplastic profile and the force with which it constricts itself around the winding surface as defined by the sliding member.

13 Claims, 3 Drawing Sheets

Figure 1:
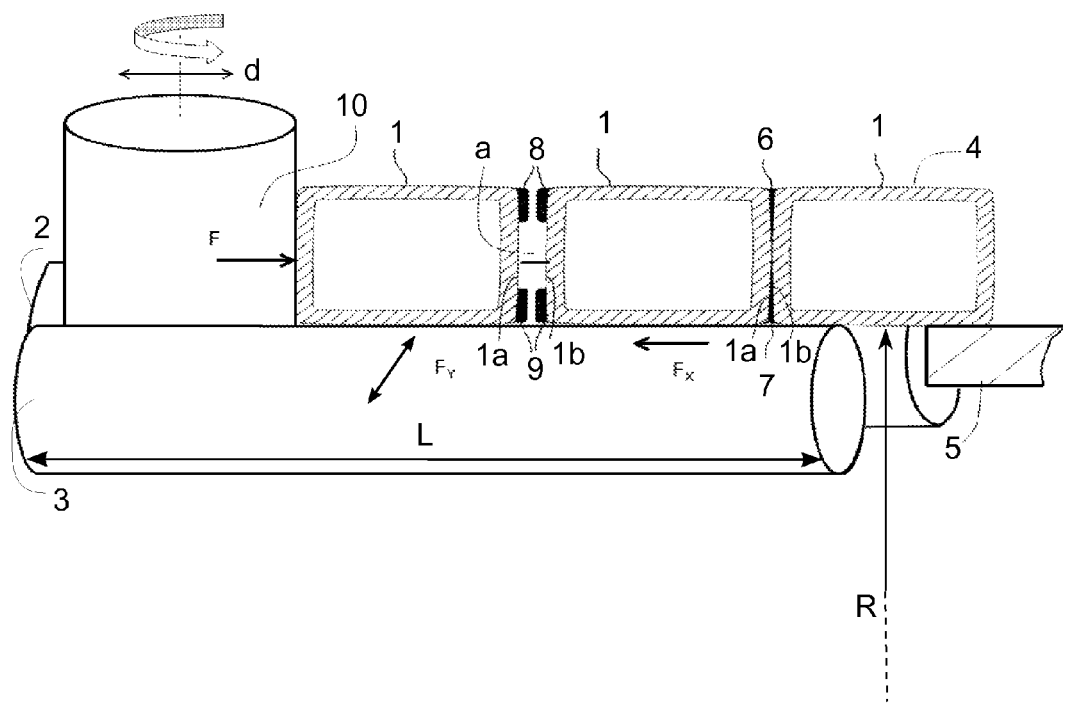

(51) Int. Cl.
*B29C 53/82* (2006.01)
*B29L 23/00* (2006.01)
*F16L 9/16* (2006.01)
*B29C 53/56* (2006.01)

(52) U.S. Cl.
CPC ......... *B29C 53/827* (2013.01); *B29L 2023/22* (2013.01); *F16L 9/16* (2013.01)

(56) References Cited

U.S. PATENT DOCUMENTS

| | | | | |
|---|---|---|---|---|
| 5,945,138 A * | 8/1999 | Wise | ................... | B29C 53/827 156/244.13 |
| 6,250,908 B1 * | 6/2001 | Foos | ................... | B29C 53/827 156/429 |
| 6,939,424 B1 * | 9/2005 | Takala | ................ | B29C 53/8091 156/191 |

OTHER PUBLICATIONS

Written Opinion of the International Searching Authority, issued in PCT/FI2013/051083, dated Feb. 21, 2014.

* cited by examiner

METHOD AND APPARATUS FOR SPIRALLY WINDING A THERMOPLASTIC PROFILE IN THE MANUFACTURE OF WELDED PLASTIC TUBES A method and apparatus for spirally winding a thermoplastic profile in the manufacture of welded plastic tubes The present invention relates to a method of spirally winding a thermoplastic profile in the manufacture of welded plastic tubes, as well as to a winding apparatus for manufacturing a spirally wound tube.

Spirally wound welded tubes of the kind now in question are shown in European Patents No. 714346 and 1237708. There a simple and reliable welding is done in one operation from the outside with one extruder. Requirements for good weld seams in thermoplastic materials includes that the surfaces to be welded are evenly heated to a correct temperature, and that the surfaces to be welded together are pressed towards each other.

In these prior solutions, welding has been carried out by means of a drum rotating along its entire length around which a thermoplastic profile is wound and on which the welding is performed. The weld joint on the outer surface of the tube is smoothed when the tube lies against the drum. This is done by allowing a stationary smoothing body to lie against and slide along the heated weld joint during the rotary motion of the tube. The weld joint inside the tube has been formed against the rotating drum, as in EP 714346, or both the inner as well as the outer weld joint are smoothed by means of extra heat and stationary bodies lying against the weld joint, as in EP 1237708.

The prior solutions have solved the problem with applying the welding mass and smoothing the weld seam surfaces reasonably well. However, controlling the force with which the profile to be welded is pulled in an essentially circumferential direction on the welding drum has been difficult, as it is mainly done by controlling the temperature and thus the friction of the profile against the drum. The necessary welding area heating and subsequent smoothing of the profile makes it difficult to control the tension of the profile independently. It is known also to use tempering of the drum by means of e.g. liquids, hot or cold air (blowers), or combinations of the aforementioned, with or without electrical heating (resistance wires), but such solutions complicate further the construction of rotating drums. The friction between the profile and the drum also affects in the lengthwise direction the forces with which the profiles need to be brought together for welded. Finally, the diameter of the tube will shrink with about 2% when cooling. This is a further production parameter to take into account, as the nominal diameter requirement of the end product must be met.

If the profile is too hot, the friction between the formed tube and the drum is too high as the shrinkage is increased and it may apply too much tension on the profile, eventually causing the profile to be deformed. If the profile is too cold, the tube will not shrink enough and a too high slipping is the result as the tube will slide and not firmly move onwards on the drum. Friction control is especially important on equipment where tubes of different plastic material are to be welded, as these parameters must be set correctly for each raw material.

The purpose of this invention is to provide an improved method and apparatus for spirally winding a thermoplastic profile in the manufacture of welded plastic tubes. The method according to the present invention for spirally winding a thermoplastic profile in the manufacture of welded plastic tubes includes the steps of:

receiving a thermoplastic profile on a plurality of sliding means being arranged in an axial direction of the tube to be manufactured and defining an essentially cylindrically shaped winding surface with a diameter essentially corresponding to the inner diameter of said tube;

directing said profile along a spiral path towards the previous turn of said profile in order to force opposite edges of said profile together for welding;

adjusting the radial position of said sliding means to control the tension in said thermoplastic profile and the force with which it constricts itself around said winding surface as defined by said sliding means.

In a preferred embodiment of the inventive method the thermoplastic profile is winded on rotating bars arranged pairwise in the axial direction of the tube to be manufactured.

Also according to a preferred embodiment of the inventive method, the sliding means are moved on brackets in a radial direction of the tube. In this way, also tubes of different diameters can be manufactured.

The apparatus to the present invention for spirally winding a thermoplastic profile in the manufacture of welded plastic tubes includes:

a plurality of sliding means arranged in an axial direction of a tube to be manufactured and defining an essentially cylindrically shaped winding surface with a diameter essentially corresponding to the diameter of the tube to be manufactured;

directing means for receiving a thermoplastic profile and directing said profile along said spiral path towards the previous turn of said profile in order to force opposite edges of said profile together for welding;

adjusting means to shift the radial position of said sliding means in order to control the tension in said thermoplastic profile and the and force with which constricts itself around said around said winding surface as defined by said sliding means.

In a preferred embodiment of the inventive apparatus the sliding means are rotating bars arranged pairwise in the axial direction of the tube to be manufactured. The directing means is a preferably rotatable roller arranged in close connection with the sliding means to form an integral unit that is movable along a bracket in a radial direction of the tube. In this way, also the manufacture of tubes of different diameters is made possible.

Figure 2:
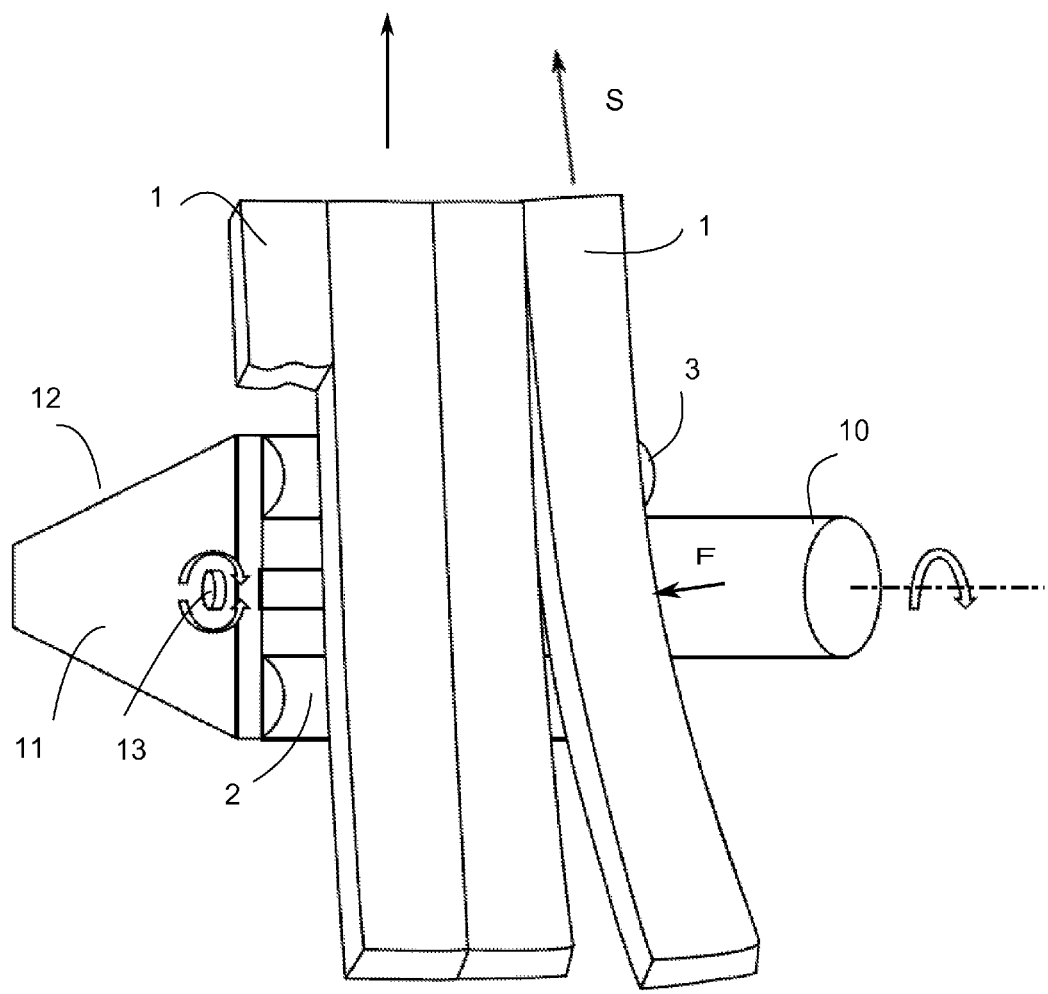
Figure 3:
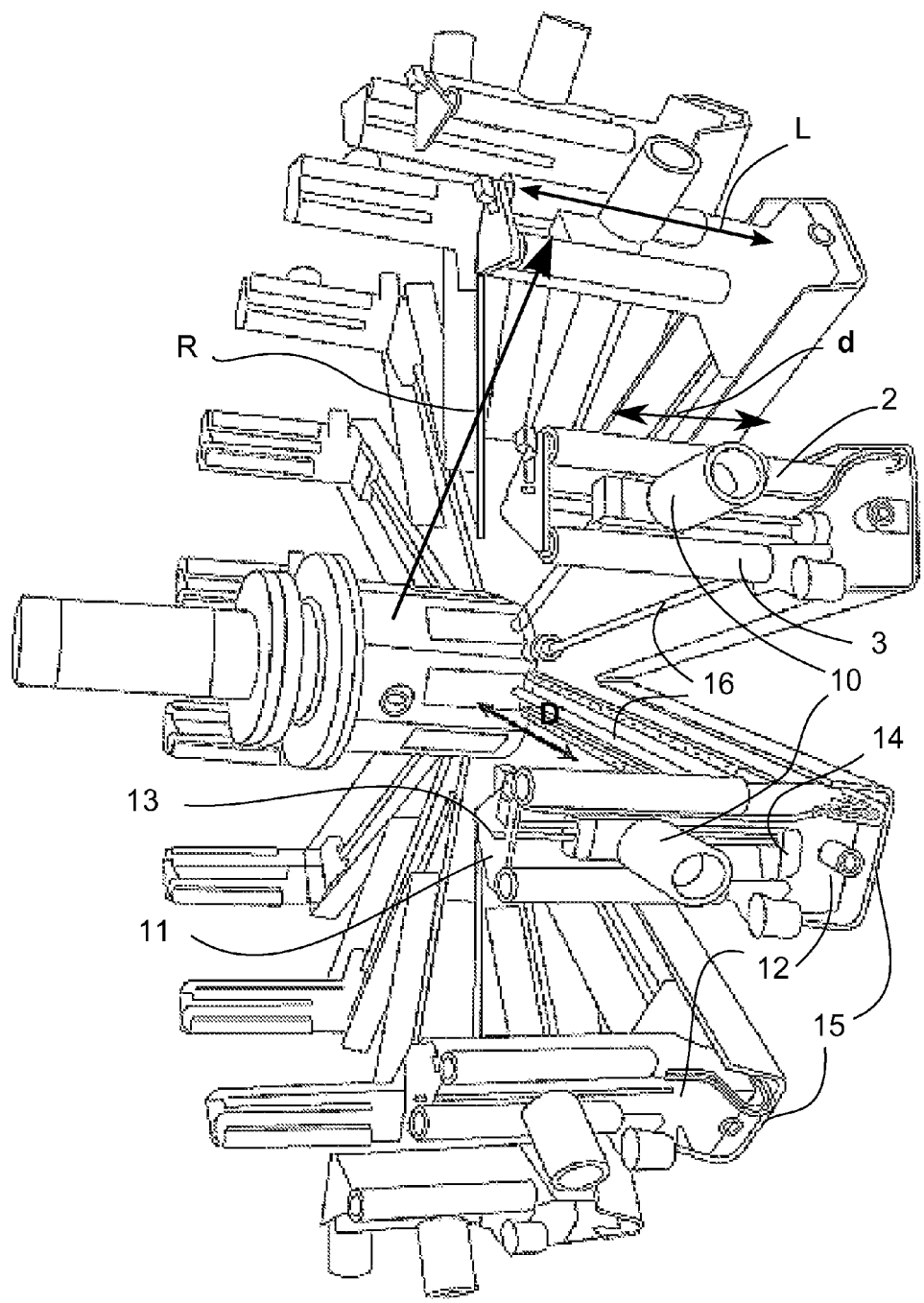

The invention is next described in more detail with reference to the accompanying drawings, wherein:

FIG. 1 shows the function of a roller unit according to the present invention;

FIG. 2 shows the construction of a roller unit according to an the present invention; and FIG. 3 shows a welding apparatus according to the present invention with roller units mounted FIG. 1 shows the basic welding process according to one embodiment of the invention. A thermoplastic profile 1 having a mainly rectangular cross-section is brought onto a multitude of sliding bars 2 and 3, arranged circumferentially along a support structure (FIG. 3). The diameter of the sliding bar structure has a diameter that generally corresponds to the inner diameter on the tube 4 to be manufactured. As can be seen in FIG. 2, the profile 1 is brought to the bars 2, 3 in an inclined fashion as shown by arrow S, forming the tube 4 out of a spiral.

One of these advantages is that guiding, heating and smoothing of the profile and the weld seam is now much easier, also from the inside. After welding, the tube 4 is slided onto a rotating drum 5 for the next manufacturing or transportation step. The sliding bars 2 and 3 are arranged in an axial direction of the tube and defines, by their length L and radius R, a cylindrical surface with a diameter generally corresponding to the inner diameter of the tube to be manufactured. The thermoplastic profile 1, having a substantially rectangular cross-section is winded up on the sliding bars 2, 3 and directed along the spiral path S (see FIG. 2). The roller 10 is adjustable (arrow d), so the position of all rollers 10 defines the desired spiral path S.

In the gap "a" to the left between the profile 1 is shown the welding mass strings 8 and 9 applied by an extruder (not shown) along preferably preheated upper and lower edge portions of the two profile surfaces 1a and 1b. The exact location, in the longitudinal direction of the profile 1, where strings S and 9 are applied, is not a critical factor with regard to the present invention. This can be done on the sliding bars 2 and 3, or before the profile enters in contact with the bars, provided the profile and the seaming mass is appropriately supported. On the right, the gap is closed, and the final double weld seams 5 and 7 are formed. The upper 8 and lower 9 welding mass strings should flow together in the final seam. The welding mass strings can within the scope of invention be applied in any desired configuration, e.g. only one string on each profile (one stream 8 and one stream 9), or only one string, e.g. between the shown strings 8 or 9 on a profile 1.

The force F applied by the roller 10 on the profile is controlled by adjusting the distance d of the roller 10 from the profile 1, as shown in the figure. The friction force component $F_X$ in the longitudinal direction of the bars need to be big enough to allow complete welding at seams 6 and 7, but still allow for smooth transfer of the tube 4 onwards. Finally, the weld seams 6 and/or 7 may after the welding be smoothed out by means of sliding shoes (not shown) or the like, which is located against the surfaces of the welded seams. In this embodiment of the invention, the sliding bars 2 and 3 are stationary while a rotating drum 5 pulls the welded profile off the bars and transports the pipe 4 to the next manufacturing step. The rotating drum 5 supporting and forwarding the tube 4 can be of any mechanical construction. Also, the sliding bars 2 and 3 may also rotate around their longitudinal axis.

In prior art solutions, the temperature of the profile 1 was altered in order to control its friction against the underlying structure. When the winded profile 1 shrinks more or less, it results in a higher or lower friction component $F_Y$, and thus in a higher or lesser tension in the profile. According to the present invention, this friction control is mainly done by controlling the radial distance of the sliding bars 2 and 3 with respect to the profile 1 and tube 4.

This is possible by having the a structure like the one shown in FIG. 2, where is shown an embodiment of the present invention where the sliding bars 2 and 3 and a roller 10 has been built to unit generally denoted by the reference number 12. The roller 10 directs the profile 1 along an inclined spiral path S during the first turn on the welding apparatus. Attached to a bracket 11 are the fixed or rotatable sliding bars 2 and 3, and an adjusting rod 13 for the roller 10. By turning the adjusting rod 13 in either direction as shown by the arrows, the roller 10 is shifted to narrow or widen the gap between the two adjacent turns of the profile 1 (gap a in FIG. 1). The intention is to keep the force F as applied on the profile 1 constant at each roller 10. The initial adjustment is based on having an equal axial displacement from one roller to each other, in order to make the path along with the profile moves during its first turn on the welding apparatus as smooth as possible. A constant change in the distance d of FIG. 1, in the longitudinal direction of the tube along path S for each roller 10, requires that d=n×W/N, where n is the order number of the roller, W is the width (mm) of the profile 1, and N is the total number of rollers 10. In the example of FIG. 3, N=16, According to the present invention, also the distance D, i.e. the radial distance of sliding bars 2 and 3 with respect to the profile 1 and the tube to be formed, can be adjusted. This brings significant advantages. The diameter of the tube manufactured can be adjusted "on the fly" by shifting the radial position D of the modules 12 in the welding apparatus shown in FIG. 3. This means the friction component $F_Y$ and thus the tension in the profile 1 can be adjusted to immediate needs of the manufacturing process. Heating or cooling of the profile for this purpose only is no longer needed, which avoids the problems with possibly conflicting temperature needs of welding and friction control. Also the friction component $F_X$ is affected and is made more easily manageable by the inventive solution.

In FIG. 3 is shown an inventive winding machine for manufacturing a spiral tube by welding. Sixteen units 12 are arranged in a circular fashion at equal spaces on radial brackets 15. As can be seen, each unit 12 has a roller 10 which position is individually adjustable along arrow d (FIG. 1). A force sensor 14 at the end of each adjusting rod 13 feels the force F applied at each roller 10. Thus any anomalies or differences are easily detected, and required adjustments of the roller position(s) can be made manually at each roller unit, based on an individual force value, or centrally and/or automatically at the control panel of the welding apparatus (not shown).

Each module 12, including bracket 11, sliding bars 2, 3 adjusting rod 13 and roller 10 with sensor 14, constitutes an integral module that is movable along the radial bracket 15 in the radial direction D of the pipe. Along each radial bracket 15, an axis 16 is provided, along which the module may slide, this providing for the adjustment of the diameter of the pipe, e.g. in order to compensate for shrinkage, and the friction forces as explained above. Also the length D and radius R of the sliding bars 2 and 3 are shown. They define, as discussed in connection with FIG. 1, the cylindrically shaped surface on which the tube can be manufactured.

An advantage in connection with the inventive welding method and apparatus is the fact that the welding is performed on a roller structure and not a closed drum or cylinder. Thus there is plenty of space to accommodate the welding mass extruder head, various heating means for heating the profile parts to be welded, for using seam smoothing means also inside the tube, and for the roller structure itself. The heating means may include hot air blowers and infrared warmers like LEISTER and INFRIA, respectively, the seam smoothing means may include adjustable pressure shoes made of PTFE or similar plastics material with a low friction coefficient, see e.g. EP 1237708. These auxiliary devices are as such well known in industry, and one with ordinary skill in the art can readily apply and use them to reach satisfactory welding results.

Also, it is clear that the welded tube 4 will within the scope of the present invention be transferred from the modules 12 of FIG. 3 onto a rotating traditional drum like the drum 5 in FIG. 1 for further transport to treatment, cutting and storing operations, or to a construction similar to the one in FIG. 3, where the tube is turned and supported by rollers or the like, or to a combination of both. Also, as can easily be seen from FIG. 3, the modules 12 are mounted on the radial extensions or brackets 15 in a star-like fashion making it possible to completely alter the diameter of the manufactured tube to various standard sizes.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments in the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of spirally winding a thermoplastic profile in the manufacture of welded plastic tubes, including the steps of:
   receiving a thermoplastic profile on a plurality of supports arranged in an axial direction of the tube to be manufactured and defining an essentially cylindrically shaped winding surface with a diameter essentially corresponding to an inner diameter of said tube;
   directing said profile along a spiral path towards a previous turn of said profile in order to force opposite edges of said profile together for welding;
   adjusting a radial position of said supports as the profile is received on the supports to control the tension in said thermoplastic profile and the force with which it constricts itself around said winding surface as defined by said supports.

2. A method of spirally winding a thermoplastic profile in the manufacture of welded plastic tubes according to claim 1, wherein the thermoplastic profile is wound on rotating bars arranged pairwise in the axial direction of the tube to be manufactured.

3. A method of spirally winding a thermoplastic profile in the manufacture of welded plastic tubes according to claim 2, wherein said supports are moved on brackets in a radial direction of the tube.

4. A method of spirally winding a thermoplastic profile in the manufacture of welded plastic tubes according to claim 1, wherein said supports are moved on brackets in a radial direction of the tube.

5. A method of spirally winding a thermoplastic profile in the manufacture of welded plastic tubes according to claim 4, wherein the radial position of said supports is shifted along said radial brackets, in order to manufacture tubes of different diameters.

6. A winding apparatus for manufacturing a spirally wound tube, comprising:
   a plurality of supports arranged in an axial direction of a tube to be manufactured and defining an essentially cylindrically shaped winding surface with a diameter essentially corresponding to a diameter of the tube to be manufactured;
   a projection receiving a thermoplastic profile and directing said profile along a spiral path towards a previous turn of said profile in order to force opposite edges of said profile together for welding; and
   means for shifting a radial position of said supports as the profile is received on the supports in order to control tension in said thermoplastic profile and the force with which the profile constricts around said winding surface as defined by said supports.

7. A winding apparatus for manufacturing a spirally wound tube according to claim 6, wherein the supports are rotating bars arranged pairwise in the axial direction of the tube to be manufactured.

8. A winding apparatus for manufacturing a spirally wound tube according to claim 7, wherein the projection is a rotatable roller arranged in close connection with said supports to form an integral unit movable along a bracket in a radial direction of the tube.

9. A winding apparatus for manufacturing a spirally wound tube according to claim 6, wherein the projection is a rotatable roller arranged in close connection with said supports to form an integral unit movable along a bracket in a radial direction of the tube.

10. A winding apparatus for manufacturing a spirally wound tube according to claim 9, wherein said means for shifting are arranged to shift the radial position of said supports along radial brackets to enable manufacture of tubes of different diameters.

11. The winding apparatus of claim 10, wherein a number of brackets equals a number of the radial supports.

12. The winding apparatus of claim 6, wherein the projection extends outwardly in a radial direction, and
   wherein the projection is movable in an axial direction.

13. The winding apparatus of claim 6, further comprising:
   a force sensor attached to the projection; and an adjusting rod moving the projection in an axial direction.

\* \* \* \* \*